No. 709,185. Patented Sept. 16, 1902.
B. TERNE.
PROCESS OF MAKING FERTILIZERS.
(Application filed May 7, 1902.)
(No Model.)
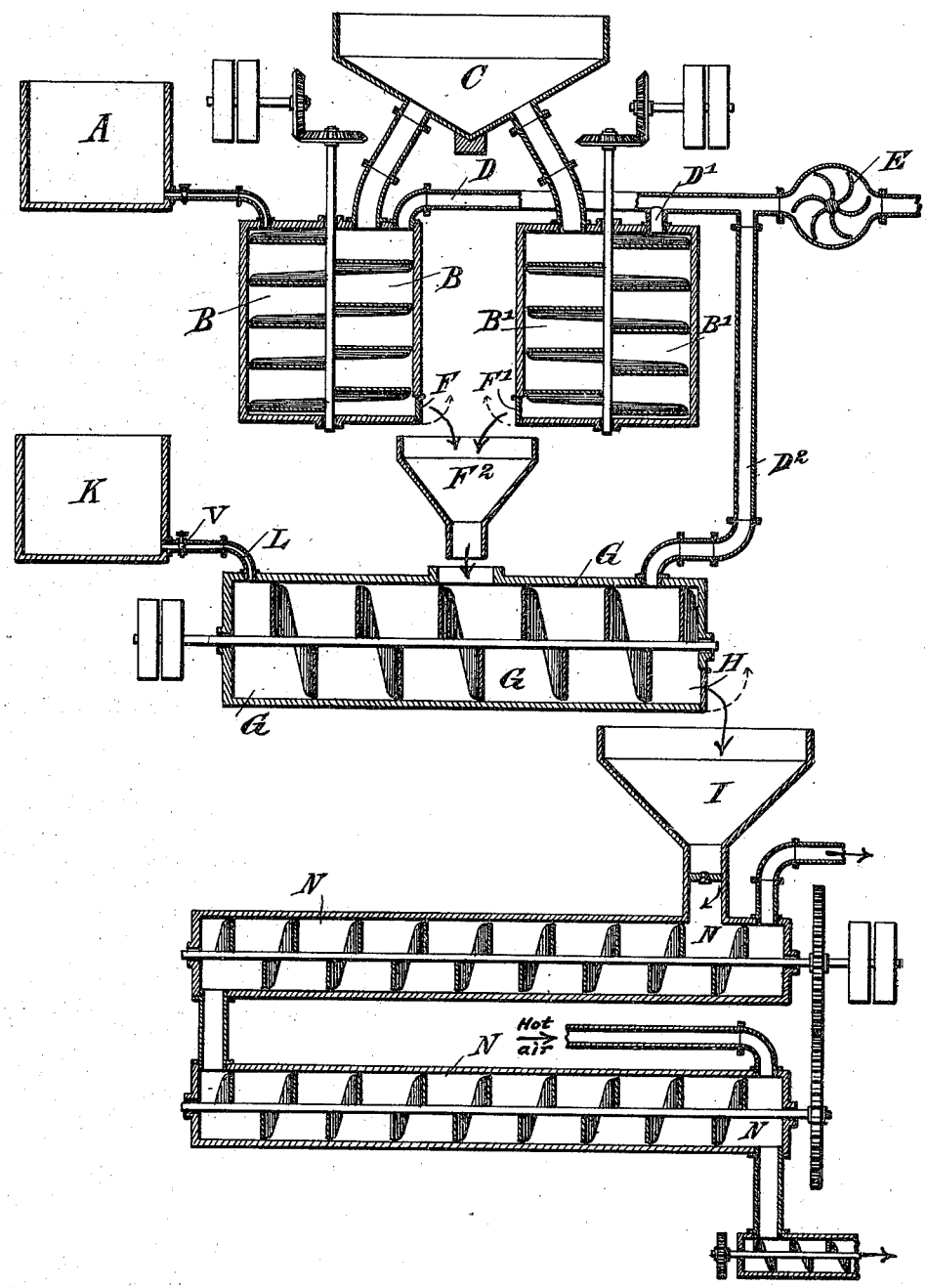

UNITED STATES PATENT OFFICE.

BRUNO TERNE, OF PHILADELPHIA, PENNSYLVANIA.

PROCESS OF MAKING FERTILIZERS.

SPECIFICATION forming part of Letters Patent No. 709,185, dated September 16, 1902.

Application filed May 7, 1902. Serial No. 106,255. (No specimens.)

*To all whom it may concern:*

Be it known that I, BRUNO TERNE, a citizen of the United States, residing in Philadelphia, in the county of Philadelphia and State of Pennsylvania, have invented certain new and useful Improvements in Processes of Making Fertilizers, of which the following is a specification.

This invention relates to an improved process of making a high grade of ammoniated fertilizers from phosphate-rock and other substances containing phosphates—such as spent boneblack, highly-steamed bones, &c., and crude ammoniacal liquors obtained from coke-ovens, gas-house retorts, &c.; and for this purpose the invention consists of a process of making fertilizers by dissolving the phosphates with sulfuric acid, neutralizing the free phosphoric acid by a concentrated ammoniacal liquor run into the same, and then drying the mass preparatory to milling; and the invention consists, further, of a fertilizer composed of a neutral mixture of ammonium phosphate, ammonium sulfate, and calcium phosphate, as will be fully described hereinafter and finally pointed out in the claim.

In the processes heretofore in use the phosphates were ammoniated by mechanically mixing the dissolved phosphated material in a dry state with ammoniates of different qualities—such as dry stock from tank-waters, azotine, cotton-seed meal, &c., together with ammonium sulfate or sodium nitrate in proper proportions—and to produce the proper mixture of said materials by analysis through the milling process.

In other processes heretofore in use organic waste products were dissolved in sulfuric acid previous to the dissolving of the phosphated materials, and this mixture was used for dissolving them instead of the acid alone; but in this instance only a low percentage of ammonia is obtainable in the product, and an additional mechanical mixture with higher ammoniated materials is necessary to make the product marketable as a fertilizer.

The object of the present process is to make in one continuous process ammoniated phosphates containing a high percentage of ammonia, all in water-soluble form, and obtain at the same time a high percentage of available phosphoric acid with a comparatively small amount of sulfuric acid used. My improved process is of the most simple kind; and it consists in treating the phosphated rock in the well-known manner with a sufficient quantity of sulfuric acid of 50° Baumé, so as to convert the insoluble phosphoric acid into soluble form. The quantity of sulfuric acid will vary according to the composition of the crude material used, the proper proportion to be mixed together being obtained in each case by an analysis of the phosphated material. When, for instance, a phosphated rock contains seventy per cent. of phosphate of lime, it will require for every one hundred pounds one hundred and thirty-six pounds of sulfuric acid of 50° Baumé, so as to convert all the phosphoric acid contained therein into soluble form. This mixture after giving the sulfuric acid sufficient time to complete the chemical displacement is then transferred into a closed vessel provided with a stirring apparatus, and the ammoniacal liquor is then run into it in a small regulated stream until a slight ammoniacal reaction of the liquor is obtained. At this point the mixture is discharged into a receiving-hopper and conducted from the same into a drying apparatus, from which the drying material is conveyed through suitable milling and screening devices, from which the fertilizer is then directly packed into bags or conveyed to storage in bulk.

The accompanying diagram shows a vertical central section of one form of apparatus that may be employed for carrying out my improved process of making fertilizers, and in which A represents a receiving-tank for the sulfuric acid; B B', closed cast-iron vessels fitted up with suitable stirring apparatus for mixing the phosphated rock with the acid, a measured quantity of the rock being conducted from the hopper C and mixed with a measured quantity of acid in the mixing vessels B B'. Near the bottom of the mixing vessels B B' are arranged gates F F', so that when the mixing is completed in the vessels B B' the dissolved phosphate-rock can be discharged into a hopper F², which is located below the mixing vessels B B' and which is made larger, so as to receive the mixture from either one or both of the mixing vessels. The hopper F² conducts the mass into a saturater G, which is provided with a central opening in its top part and with a horizontal stirring mechanism. The upper parts of the mixing vessels and the upper part of the saturater are connected by pipes D D' D² with an exhaust-fan E for drawing off the noxious gases to suitable condensers or such other devices as may be used for taking care of the gases and rendering the same harmless before permitting them to escape into the atmosphere. The saturater G is supplied from a receiving-tank K with a suitable ammoniacal liquor that is conducted through a pipe L, provided with a stop-cock V for regulating the supply and prevent too much foaming of the mass. After the mass has been thoroughly mixed in the saturater with the ammoniacal liquor until tests taken show neutralization the contents are discharged through a gate H in the outgoing end of the saturater and conducted through a hopper I into a drier N by opening a valve in the upper part of the drier N. The drier has to be of such a construction and dimensions so as to dry the material sufficiently during its passage through the same and leave it in a dry state suitable for milling. Any desired construction of drier can be used, the one shown consisting of two cylindrical drums, each being provided with a stirring apparatus. Hot air is supplied to the outgoing end of one of the cylinders of the drier and conducted in opposite direction through the mass, passing through the same, an outlet-pipe being arranged near the ingoing end of the upper cylinder. The hot air may be the waste heat obtained from a steam-furnace or from any other source. The size of the drier is made according to the quantity to be treated in a given time; but it should be capable of drying at least from two to three tons per hour.

By my improved process a high grade of ammoniated fertilizer is obtained, in which the phosphates are present in soluble form, while the product forms by its contents of ammonium phosphates and ammonium sulfates a plant food of superior quality.

Having thus described my invention, I claim as new and desire to secure by Letters Patent—

The process herein described of making fertilizers, which consists in treating a phosphate-containing substance with sulfuric acid for rendering the same more fully soluble, simultaneously agitating the mass and adding slowly to the same a concentrated ammoniacal liquor and drawing off the resulting fumes, forcing a current of dry heated air through the mass and simultaneously agitating the same, and finally grinding and pulverizing the mass for use, substantially as set forth.

In testimony that I claim the foregoing as my invention I have signed my name in presence of two subscribing witnesses.

BRUNO TERNE.

Witnesses:
FRANK TERNE,
NANNA TAYLOR.